(12) United States Patent
McLeod

(10) Patent No.: US 8,870,620 B2
(45) Date of Patent: Oct. 28, 2014

(54) MULTIPLE REED GAME CALL

(76) Inventor: Levi McLeod, Delta, CO (US)

( * ) Notice: Subject to any disclaimer, the term of this patent is extended or adjusted under 35 U.S.C. 154(b) by 141 days.

(21) Appl. No.: 13/587,399

(22) Filed: Aug. 16, 2012

(65) Prior Publication Data
US 2013/0045657 A1 Feb. 21, 2013

Related U.S. Application Data

(60) Provisional application No. 61/524,890, filed on Aug. 18, 2011.

(51) Int. Cl.
*A63H 5/00* (2006.01)
*A01M 31/00* (2006.01)

(52) U.S. Cl.
CPC .................................. *A01M 31/004* (2013.01)
USPC ........................................................ 446/207

(58) Field of Classification Search
None
See application file for complete search history.

(56) References Cited

U.S. PATENT DOCUMENTS

| | | | |
|---|---|---|---|
| 555,530 A * | 3/1896 | Peckham | 105/213 |
| 3,968,592 A | 7/1976 | Piper | |
| 4,207,703 A | 6/1980 | Saso | |
| 4,335,539 A | 6/1982 | Jones | |
| 5,222,903 A * | 6/1993 | Parrott et al. | 446/207 |
| 6,234,860 B1 * | 5/2001 | Cook | 446/208 |
| 6,527,614 B1 * | 3/2003 | Primos | 446/207 |
| D498,165 S * | 11/2004 | Primos et al. | D10/119.2 |
| 6,879,032 B2 * | 4/2005 | Rosenau et al. | 257/696 |
| 6,926,578 B1 * | 8/2005 | Casias et al. | 446/202 |
| 7,357,693 B1 * | 4/2008 | Roberts | 446/216 |
| 7,384,323 B2 * | 6/2008 | Sceery | 446/208 |
| 7,465,213 B1 * | 12/2008 | Pribbanow | 446/202 |
| 7,658,660 B1 * | 2/2010 | Drury | 446/206 |
| 7,727,044 B1 * | 6/2010 | Johnson | 446/208 |
| 7,785,166 B1 | 8/2010 | Kirby | |
| D642,950 S * | 8/2011 | Barden | D10/119.1 |
| 8,016,637 B2 * | 9/2011 | Pribbanow | 446/202 |
| D661,214 S * | 6/2012 | McLeod | D10/116.1 |

OTHER PUBLICATIONS

Primos Hunting Calls—Cow, website at https://shop.primos.com/c-15-cow.aspx, 2011, 2 pages.
Notice of Allowance for U.S. Appl. No. 29/399,883 mailed Jan. 30, 2012, 8 pages.

* cited by examiner

*Primary Examiner* — Kurt Fernstrom
*Assistant Examiner* — Dolores Collins
(74) *Attorney, Agent, or Firm* — Sheridan Ross P.C.

(57) ABSTRACT

A game call having a plurality of reeds is provided for simulating the sound of a game animal. The call provides sounding board with first and second opposing faces and at least one reed associated with the first face and the second face. A user may selectively operate one or more of the reeds in order to simulate the call or sound of one or more animals.

16 Claims, 2 Drawing Sheets

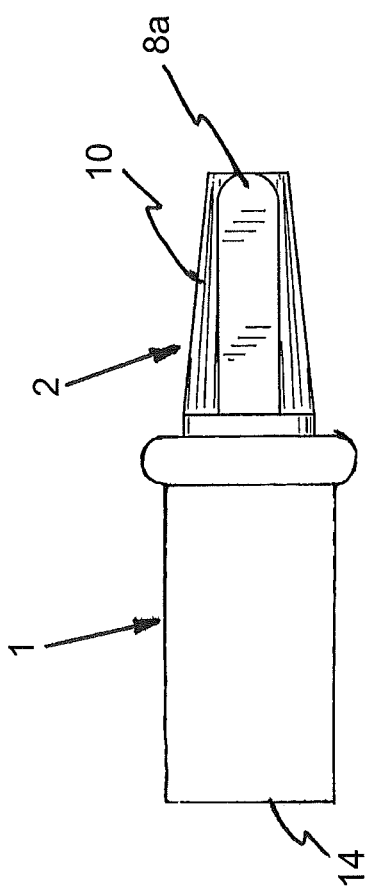
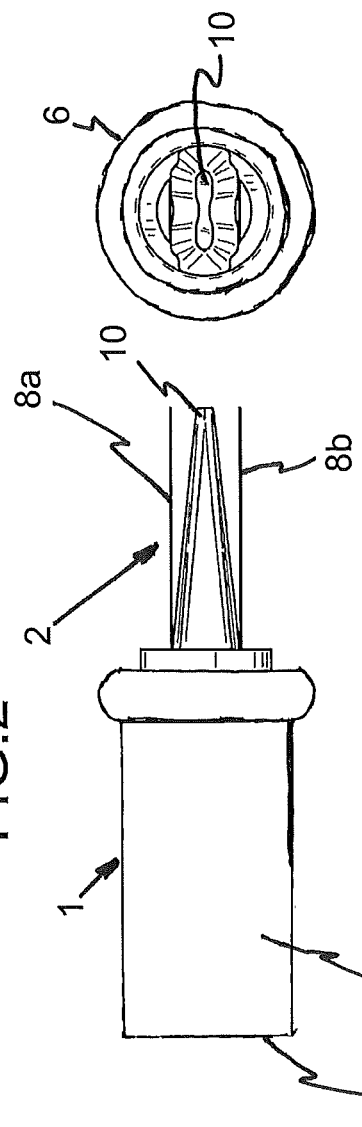
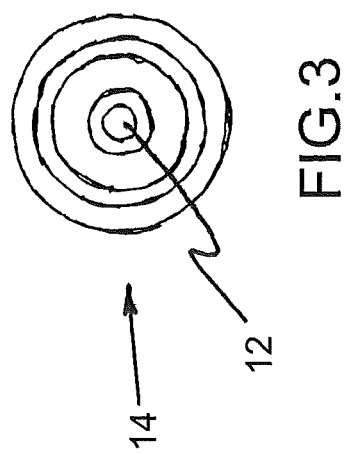

MULTIPLE REED GAME CALL

CROSS REFERENCE TO RELATED APPLICATIONS

This application claims the benefit of U.S. Provisional Patent Application No. 61/524,890, filed on Aug. 18, 2011, the entire disclosure of which is incorporated by reference herein. This application also cross-references U.S. Design Pat. No. D661,214 issued Jun. 5, 2012, the entire disclosure of which is also incorporated by reference herein.

FIELD OF THE INVENTION

The present invention relates generally to game calls. More specifically, the present invention relates to game calls having a plurality of reeds and improved air flow dynamics for re-creating the natural call of an animal, and more specifically to create a sound which imitates two distinct animals.

BACKGROUND

It is known to be desirable to attract animals by simulating or recreating the natural sound of the animal of the same or other species. The desirability of game calls for attracting wild game and birds into a certain area has long been recognized by sportsman and animal viewers. To be effective, a game call must closely simulate the sound of the animal being lured or an animal of interest to the animal being lured. In order to accomplish this objective, calls must be easy to use in that minimal preparation of the device should be required, intensity of the sounds easily varied, and the device easily carried. Prior art game calls include both diaphragm and reed calls, such as those disclosed in U.S. Pat. Nos. 3,968,592, 4,207,703, 4,335,539, 6,926,578 and 7,785,166, all of which are hereby incorporated by reference in entireties.

Known devices, however, fail to provide various features of the present invention, such as the ability to appropriately simulate the call or sound of a plurality of animals. For example, U.S. Pat. No. 6,926,578 to Casias et al. provides a double inlet game call having a side-by-side configuration. Such devices, however, are difficult to control, required that a user simultaneously operate both reeds, and suffer from excessive vibration.

SUMMARY OF THE INVENTION

Accordingly, the present invention contemplates a novel system, device, and methods for simulating the natural sounds of one or more game animals in order to attract the animals to a desired location or region.

In various embodiments, a game call is provided with opposing reed structures arranged in a back-to-back configuration with respect to a sounding board. The call may simultaneously replicate the sound of at least two animals in a preferred state of use. In a preferred embodiment, each reed is associated with an air passage, each of said air passages being of different size and/or shape and configured for accommodating different flow rates of air. Accordingly, a user may operate a single reed in order to replicate the sound of a particular animal or may simultaneously operate both reeds in order to replicate the sound two animals, such as a cow and a calf elk or the interaction between two cows, for example. In various embodiments, a call is provided for replicating the sound of common game animals, such as elk or deer. It will be expressly recognized, however, that the present invention is not limited to any particular animal, phylum, genus, species, gender, etc.

In various embodiments, a sound chamber may be utilized in connection with the double inlet game call apparatus according to the present invention. The sound chamber functions to convert or enhance sounds made by the double reed assemblies. Where no sound chamber is utilized in connection with the double reed assemblies, the sounds and tones produced by the game call are very loud and strong. In contrast, when the sound chamber is used in connection with the reed assembly section, a much softer or lowered tone or sound is produced by the game call apparatus. Based on the positioning of a user's mouth and teeth over the call and associated reeds, a unique variety of sounds can be effectively made.

In various embodiments, a double reed game call is provided wherein at least one of the reeds is removable. For example, in one embodiment, one or both reeds may be selectively removed by a user where it is desirable to simulate to the sound of a single animal. It should be recognized that removal of one reed is not required in order to replicate the sound of a single animal. However, in various embodiments, this option is provided to a user in order to further facilitate recreating the sound(s) of a single animal. Additionally, one or more of the reeds may be selectively removed in order to facilitate storage or cleaning of the device.

Reeds and sounding boards of the present invention may be constructed of any suitable material, such as various plastics. In a preferred embodiment, the reeds are constructed from a plastic of sufficient durability and corrosion resistance, but are flexible enough to allow for the appropriate vibration when air is passed over the reeds. Sound chambers of the present invention may be constructed from any number of appropriate materials including, but not limited to wood, plastic, metals, and various combinations thereof.

In various embodiments, reeds of the present invention comprise a length of between approximately 1.0 and 2.0 inches. In a preferred embodiment, at least one reed of the game call comprises a length of approximately 1.50 inches. In various embodiment, reeds of the present invention comprise a width of between approximately 0.25 and 0.75 inches. In a preferred embodiment, at least one reed of the game call comprises a width of between approximately 5/16 and 1/2 inches. The sound chamber of the call, in a preferred embodiment, is approximately 1.75 inches in length and approximately 5/8 inches in width.

Reeds of the present invention may be provided with either round or square tipped ends. In at least one embodiment, a game call is provided having a first reed with a substantially rounded tip and a second reed with a substantially square tip. Such an arrangements facilitates the simultaneous replication of the sound(s) of at least two animals.

The double inlet game call apparatus according to the present invention will allow the user to create sounds that simulate one or more animals more effectively as compared to prior art game calls. Further, the multiple sounds created by the present double inlet game call apparatus will attract animals, particularly elk, more efficiently because both reed assemblies remain in the game caller's mouth. The present game call also more realistically simulates the fighting cow calls made during an elk breeding season or "rut."

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

Figure 1:
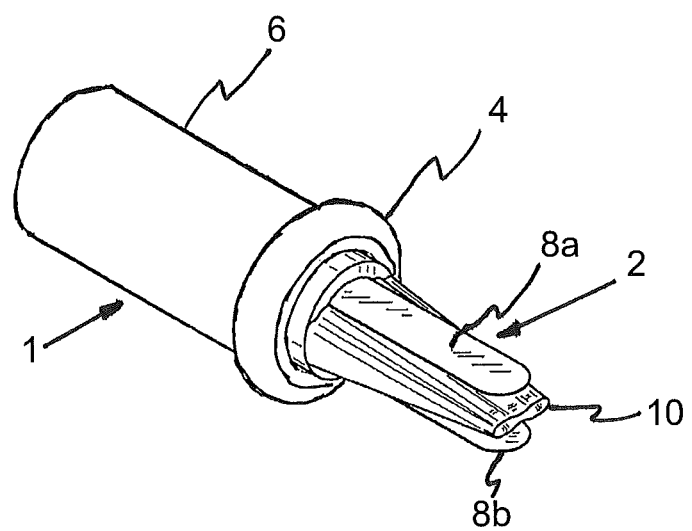

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

FIG. 1 is a front perspective view of a game call device according to one embodiment;

FIG. 2 is a top plan view of a game call device according to one embodiment;

FIG. 3 is left elevation view of a game call device according to one embodiment;

FIG. 4 is a front elevation view of a game call device according to one embodiment; and FIG. 5 is a right elevation view of a game call device according to one embodiment.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Referring now to FIGS. 1-5, a game call having multiple reeds according to one embodiment of the present invention is shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

In various embodiments, a dual reed assembly section 2 is provided in communication with attachment portion 4 and sound chamber 6. The assembly section 2 comprises reeds 8*a*, 8*b* and a sounding board 10. A first air passageway extending into the sound chamber 6 is provided in association with a first reed 8*a* and a second air passageway extending into the sound chamber 6 is provided in association with the second reed 8*b*. In one embodiment, the first and second air passageways comprise separate passages along at least a portion of the device 1. The sound chamber 6 comprises a generally hollow cylinder defining a mixing chamber wherein air from the first and second passageways is allowed to interact prior to exiting the device 2 through a downstream outlet 12.

In various embodiments, game calls of the present invention comprise one or more rings or apertures extending from or formed within a portion of the device 2 for receiving a lanyard or attachment device. Such embodiments provide means for attaching the device to various objects, such as clothing items or lanyards to be worn around a user's neck.

In an alternative embodiment, a sound chamber 6 is provided which includes an expansion area and a restricted outlet end opening 12 to create back pressures. Sound chamber 6 includes an expansion area and a restricted outlet end opening 12. A partition may be selectively provided in the sound chamber 6 to divide and/or maintain two separate sound chambers. Where the partition is not provided, air and sounds passing through the sound chambers are allowed to mix prior to leaving the game call through the outlet 12. A plurality of apertures may also be provided at the downstream end of the device 14 and/or along peripheral walls of the sound chamber 6. These apertures may be covered or left open to adjust the tones produced by the game call.

In operation, a game call according to the present invention is inserted into a user's mouth so that the first and second sounding boards, air passageways, and reeds are placed simultaneously inside the mouth of the user of the game call apparatus. The user then passes air across the first reed to produce sound, and may also pass air across the second reed to produce sound. Therefore, the user may produce sounds by passing air across both the first and second reeds simultaneously so that sounds from the first reed and sounds from the second reed overlap temporally. In addition, a user may produce sounds by passing air across the first reed and then, alternatively, by passing air across the second reed so the sounds produced by the respective reeds are separate in time. The user may adjust the position of the game call while using the call to create such overlapping and/or separate sounds. This alternating motion of the game call may be combined with moving the mouthpiece assembly in and out of the user's mouth to change the effective length of the reeds. Further, by applying pressure with the teeth and/or tongue in a variety of locations on one or more of the reeds and call assembly, a variety of different sounds can be created. The resulting sounds simulate the sounds of multiple game animals.

In various embodiments, the present invention also provides a user with the ability to operate a single reed of the game call device, thereby simulating the sound of only a single animal. Whereas prior art devices only provide the ability to produce the sound of a plurality of animals simultaneously, the present inventions provide a user with the ability to simulate the sound of only a single animal or, alternatively, a plurality of animals. This is advantage is provided by the novel arrangement of the reeds 8a, 8b contacting opposing surfaces of the sounding board 10. Accordingly, a user is provided the option of placing the sounding board 10 and a single reed 8a or 8b in the user's mouth to simulate the sound of a single animal, as well as the option of placing both reeds 8a and 8b and the sounding board 10 in a user's mouth to simulate the sound of a plurality of animals. In one embodiment, each of the reeds may be selectively removed to operate the device with only one reed. Further, different seizes of reeds may be used to created different sounds as desired by the user.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A game call apparatus, comprising:
   a sounding board comprising a first and second sounding surface, the first and second sounding surfaces being oriented on substantially opposing sides of the sounding board;
   a first air passageway formed along said first surface of the sounding board;
   a second air passageway formed along said second surface of the sounding board;
   a first reed coupled adjacent the first air passageway, said first reed vibrating to produce sounds as air passes over said first reed;
   a second reed coupled adjacent the second air passageway, said second reed vibrating to produce sounds as air passes over said second reed;
   the first and second reeds being substantially parallel for simultaneous positioning inside the mouth of a user;
   wherein the first and second air passageways are completely separate from one another along areas corresponding to the respective reeds and further comprising a mixing chamber immediately downstream of the first and second air passageways, the mixing chamber receiving air as it passes from the first and second air chambers to mix the sounds before exiting the call.

2. The game call apparatus of claim 1, wherein said first reed and said first air passage produce the sound of a first animal and said second reed and said second air passageway produce the sound of a second animal.

3. The game call apparatus of claim 2, wherein said first animal and second animal comprise different species or different genders of a species.

4. The game call apparatus of claim 2, wherein said first animal and second animal comprise different animals of the same species.

5. The game call apparatus of claim 1, wherein said first reed comprises a different geometry from said second reed.

6. The game call apparatus of claim 1, wherein at least one of said first reed and said second are removable.

7. The game call apparatus of claim 1, wherein at least one of the first reed and the second reed has a length between approximately 1.0 and 2.0 inches.

8. The game call apparatus of claim 1, wherein at least one of the first reed and the second reed has a width between approximately 0.25 and 0.75 inches.

9. The game call apparatus of claim 1, wherein at least one of the first reed and the second reed has a substantially square tip.

10. The game call apparatus of claim 1, wherein at least one of the first reed and the second reed has a substantially rounded tip.

11. The game call apparatus of claim 1, wherein the mixing chamber comprises an expansion area and a restricted outlet, the outlet being selectively operable to adjust tones produced by the game call.

12. A method of simulating an animal sound, comprising:
   providing a game call apparatus, comprising: a sounding board comprising a first and second sounding surface, the first and second sounding surfaces being oriented on substantially opposing sides of the sounding board, a first air passageway formed along the first surface of the sounding board, a second air passageway formed along the second surface of the sounding board, a first reed coupled adjacent the first air passageway, the first reed vibrating to produce sounds as air passes over the first reed, a second reed coupled adjacent the second air passageway, the second reed vibrating to produce sounds as air passes over the second reed, the first and second reeds being substantially parallel for simultaneous positioning inside the mouth of a user, wherein the first and second air passageways are completely separate from one another along areas corresponding to the respective reeds and further comprising a mixing chamber immediately downstream of the first and second air passageways, the mixing chamber receiving air as it passes from the first and second air chambers to mix the sounds before exiting the call;

determining whether the sound of a single animal or the sound of a plurality of animals is desired;

based on said determining step, placing said first reed in the mouth of a user and directing air through said first air passageway in order to simulate the sound of a single animal and placing both said first and said second reeds in the mouth of a user and directing air through said first and said second air passageways to simulate the sound of a plurality of animals.

13. The method of claim 12, wherein at least one of the first reed and the second reed has a length between approximately 1.0 and 2.0 inches.

14. The method of claim 12, wherein at least one of the first reed and the second reed has a width between approximately 0.25 and 0.75 inches.

15. The method of claim 12, wherein at least one of the first reed and the second reed has a substantially square tip.

16. The method of claim 12, wherein at least one of the first reed and the second reed has a substantially rounded tip.

* * * * *